Nov. 21, 1961
M. LEACH
3,009,460
VIBRATORY DEVICE
Filed Feb. 6, 1958
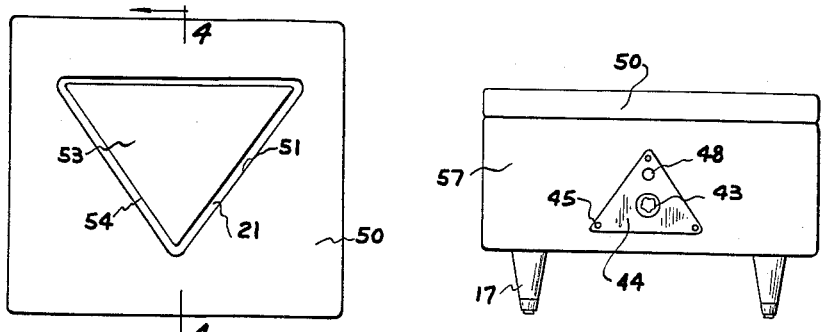
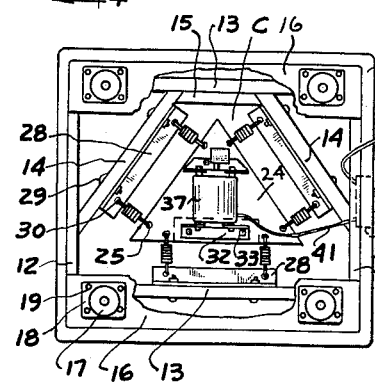
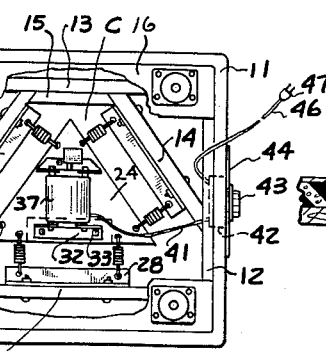
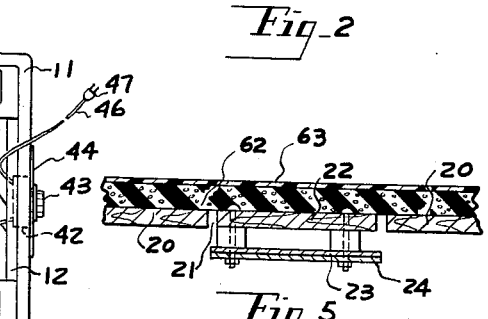
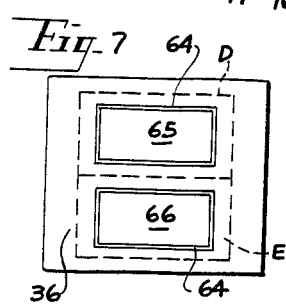
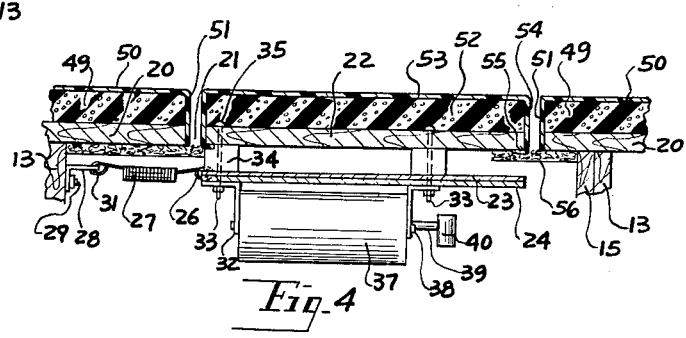
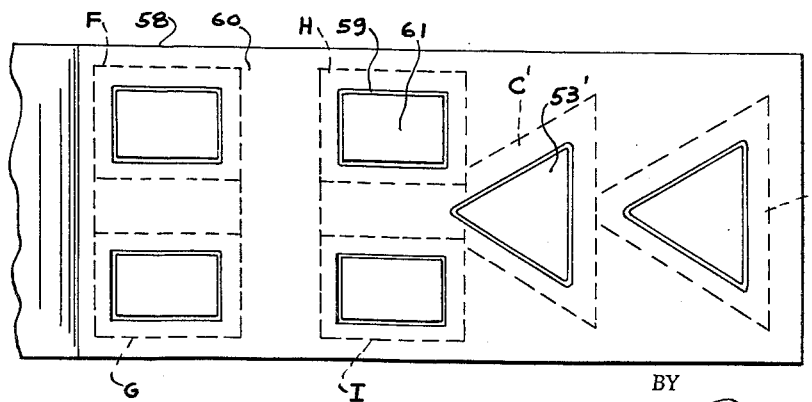
INVENTOR.
MARK LEACH
BY
Robert A. Sloman
ATTORNEY United States Patent Office 3,009,460
Patented Nov. 21, 1961

3,009,460
VIBRATORY DEVICE
Mark Leach, Pontiac, Mich.
(Milford, Mich.)
Filed Feb. 6, 1958, Ser. No. 713,622
5 Claims. (Cl. 128—33)

This invention relates to a massage couch or legrest or ottoman and more particularly to an electrically operated vibration mechanism designed for simulating the effects of manual massage.

The present invention is a variation of my presently co-pending patent application, Serial No. 646,140, filed March 14, 1957, relating to a vibrating couch construction, which will issue into United States Patent 2,822,804 on February 11, 1958; now Reissue Patent 24,487, dated June 17, 1958.

It is the primary object of the present invention to produce an electrically operated vibration couch, legrest or ottoman which incorporates one or more low horsepower motors, having an eccentrically mounted weight upon the shaft thereof for providing controlled vibrations adapted to be transmitted throughout parts of the couch, legrest or ottoman directly to the user's body or to his legs and feet.

It is the further object of the present invention to provide a novel mounting for the vibration producing motor together with means for transmitting the vibrations produced to the vibration pad or pads forming a part of the couch, legrest or ottoman.

It is the further object herein to provide a rheostat or similar control switch whereby the speed of operation of the motor or motors may be variably controlled at the will of the user.

It is the further object of the present invention to incorporate into the present couch, legrest or ottoman a novel vibration pad which has a resilient floating mounting within a similarly shaped aperture and which vibration pad lies within the plane of a horizontal support platform and to which pad are directed controlled vibrations produced by the power operated vibrating means, such as an unbalanced electric motor.

It is the further object of the present invention to provide a novel mounting for the unbalanced electric motor which includes a support plate resiliently and floatingly mounted upon the frame and with means provided for supportably securing a vibration pad loosely within the support platform and connected with said support plate.

It is the further object of the present invention to provide an ottoman construction which includes a frame and a horizontal support platform which is apertured and which is covered with an upholstered resilient support such as leather or vinyl covered sponge rubber. Mounted within the aperture in the support platform is an individual resilient, separately and similarly upholstered vibration pad generally coplanar with the upholstered surface of the top of the ottoman and which has associated therewith a vibration producing means.

It is a further object to provide a single resilient support for the top of the ottoman including the vibration pad with a unitary leather or vinyl top co-extensive with the top of the ottoman.

It is a further object that the present invention be incorporated into a vibration couch having a series of upright openings formed through the top thereof in spaced relation with said couch covered with a similarly apertured resilient body and upholstered with a suitable cover such as leather or vinyl. Within each of the separate openings are separately upholstered resiliently mounted vibration pads, each of which has a vibration source for transmitting substantially localized vibrations to the individual vibration pads.

These and other objects will be seen from the following specifications and drawings in which:

FIG. 1 is a plan view for a legrest or ottoman incorporating the present invention.

FIG. 2 is a side elevational view thereof.

FIG. 3 is a bottom plan view thereof partly broken away for illustration.

FIG. 4 is a fragmentary section on an enlarged scale taken on line 4—4 of FIG. 1.

FIG. 5 is a fragmentary section similar to FIG. 4, showing a slight variation.

FIG. 6 is a fragmentary plan view of a vibration couch showing a series of individual separately upholstered vibration pads.

FIG. 7 shows a variation of FIG. 1.

It will be understood that the above drawing illustrates merely several preferred embodiments of the invention and that other embodiments are contemplated within the scope of the claims hereafter set forth.

Referring to the above drawing, the couch construction shown in FIG. 6 is substantially in accordance with that shown in my co-pending patent application above referred to.

Referring to FIGS. 1 through 5, the ottoman or legrest includes a frame which includes the four upright side walls 11, preferably of wood, and upon the interior of a pair of said walls the additional upright elongated supports 12.

The frame also includes the pair of spaced transverse upright braces or supports 13 interconnecting a pair of walls 11. The vibration compartment C is furthermore defined by the pair of converging and spaced cross supports 14 whose one ends connect members 12 and whose opposite ends connect cross member 13, there being an additional reinforced support member 15 as shown in FIG. 3, which elements define the framework of the present ottoman or legrest.

Bridging and joined to the upper edges of frame 11 is a horizontally disposed support platform 20, which for illustration is constructed of plywood.

It will be noted in FIG. 3 that the lower edges of inner frame members 12 are elevated from the undersurface of frame 11 and arranged thereunder and suitably secured thereto are the spaced leg mounting plates 16. Legs 17 depend from the respective corners of the ottoman and at their upper ends include mounting flanges 18 secured to plates 16 by fasteners 19.

There is formed within support platform 20 a transverse aperture 21, of predetermined shape, such as a square or triangular, but which in FIG. 1 is shown as triangular. In FIG. 6, some of the openings in a similar support platform are shown rectangular as at 59.

Vibration pad 22 conforming to the shape of aperture 21 and of less dimension is loosely nested within the said aperture and within the plane of platform 20, and in the manner hereafter described, is adapted for controlled vibrations within said platform.

Spaced below pad 22 and preferably of the same shape is the metallic mounting plate 23 which may be of steel or aluminum, for illustration, and upon the undersurface thereof there is applied a resilient lamination 24 of fibreglass or rubber.

The plate assembly 23—24 has formed therethrough adjacent its edges and at spaced points a series of apertures 25 adapted to receive the hooked ends 26 of coiled springs 27. These springs are arranged around the side walls of plate 23 for resiliently supporting the same in a manner hereafter described.

Referring to FIGS. 3 and 4 there are arranged in a horizontal plane a series of angle plates 28 spaced from each other and effectively secured by fasteners 29 to the crossmembers 13 and 14. Each of plates 28 has formed therethrough a pair of spaced apertures 30 adapted to receive the other hooked ends 31 of coiled springs 27 for completing the resilient and floating mounting for triangular mounting plate 23.

It is contemplated that should a plate be employed which is rectangular or square, then in that case there would be provided an additional mounting plate 28, so that said plates would correspond to and lie parallel to the respective edges of the metallic plate. For example, it is contemplated that in the ottoman shown in FIG. 1, there may be more than one vibration pad such as two such pads. In that case, it would be preferable to employ vibration pads and corresponding mounting plates which would be square or rectangular, with each of such pads and plates within an individual compartment similar to compartment C of FIG. 3. This is shown in FIG. 7.

Such pair or plurality of vibration pads can be activated by a single motor or on the other hand each pad may have its separate motor and arranged in assembly as shown in FIGS. 3 and 4.

While FIG. 1 shows one vibration pad for the ottoman or legrest, I do not wish to limit myself to a single vibration pad. The operation would be just the same with two or more such pads.

Arranged upon the undersurface of mounting plates 23—24 are a pair of spaced motor mounting flanges 32 secured thereto by the fasteners 33. The electric motor 37 is interposed between flanges 32 and suitably secured thereto by fasteners 38. In the present preferred embodiment $\frac{1}{12}$ horsepower motors are employed. It is contemplated, however, that the power of the motors may be varied and still remain within the low horsepower classification.

While angle plates 28 have been shown as one means of anchoring coiled springs 27, it is contemplated that any other suitable anchoring to the frame may be employed such as with clips or the like.

In the preferred embodiment of the invention, the springs 27 are coated with a plastic or rubber substance to eliminate noise and to provide for a quiet operation. By this construction and as shown in FIG. 3, the plate 23 is provided with a resilient mounting with respect to the frame. The motor 37 operates at approximately 1700 r.p.m. It is contemplated, however, that this range may be varied up to 5000 r.p.m.

Control means are provided in the form of a rheostat 42 with manual control dial 43 for regulating current supply to motor 37 through the wires 41 shown in FIG. 3. Accordingly, the speed of rotation and consequently the extent and amplitude of vibration may be selectively varied by the user.

Motor 37 has a conventional driveshaft 39 and mounted upon the end thereof the eccentrically arranged weight 40 whereby operation of the motor sets up vibrations which are transmitted to mounting plate 23 and thence to vibration pad 22 in the manner hereafter described.

The above rheostat 42 is mounted with respect to control plate 44 secured at 45 upon the exterior of frame 11. Electrical power is supplied to the rheostat through cord 46 and conventional plug 47. Interposed in the circuit is a bulb 48, on plate 44 which when illuminated indicates that wire 46 has been plugged in. Accordingly bulb 48 serves as a warning to disconnect the plug when the device is not in use.

Mounting plate 23 is spaced below and parallel to vibration pad 22 with a series of spacers 34 interposed. These are constructed of wood or rubber and the assembly secured together by a series of bolts 33 whose heads 35 supportably bear against the top surface of pad 22 completing the vibration assembly.

Relatively thick flexible and resilient cover 49 is positioned upon and suitably joined to the horizontal platform 20, and in the preferred embodiment is constructed of sponge rubber. Said resilient cover is co-extensive with the top surface of support platform 20 and is apertured to correspond to the vibration pad receiving opening 21. The resilient cover for the platform includes upon the exterior thereof a retaining surface of leather or plastic, such as vinyl or Naugahyde completing the upholstering of the support platform exclusive of the upholstering of the individual vibration pad 22 or pads, should more than one pad be employed.

As shown in FIG. 4, the covering 50 for the sponge rubber 49 extends along the interior bounding walls of aperture 21 as indicated at 51 down to the bottom of platform 20.

The vibration pad 22 has mounted thereon and coplanar with resilient support 49, a corresponding resilient support 52 of sponge rubber which is similarly upholstered or covered at 53 by a relatively thin material such as leather, plastic, Naugahyde or vinyl.

As noted in FIG. 4, this covering 53 extends around and along the side walls of resilient support 52 as at 54, past the vibration pad 22 and extends partly thereunder to provide a separately upholstered vibration pad 22, generally coplanar with the apertured platform of the ottoman. Peripheral portions of cover 53 are secured to the undersurface of pad 22 as at 55.

Extending along the undersurface of platform 20 and secured thereto is a fibreglass pad 56 which bridges the space between said platform and the vibration pad 22, being apertured to receive said pad. Portions of the fibreglass pad are secured to the undersurface of peripheral portions of pad 22. The side walls of frame 11 are preferably covered with a suitable plastic material 57 such as leather, vinyl or Naugahyde to complete the ottoman assembly.

A slight variation of the construction shown in FIG. 4 is indicated fragmentarily in FIG. 5, wherein the vibration pad 22 is not separately upholstered, but wherein a single resilient sponge rubber cover 62 extends over platform 20 as well as over the vibration pad 22 co-extensive with the top surface of the ottoman.

There is also provided a top covering 63 of a suitable, plastic or other material which is furthermore co-extensive with the top surface of the ottoman to provide a more finished article of furniture.

Referring to FIG. 6 there is fragmentarily shown a vibration couch similar to what was shown in my co-pending application, Serial No. 646,140 with the exception that FIG. 6 shows a series of vibrating pads as being individually upholstered and vibratable within correspondingly shaped openings 59 formed through the top surface of the couch and through the corresponding support platform, similar to platform 20, FIG. 4.

The vibrating pad generally indicated at 53' corresponds to vibrating pad 53 shown in FIGS. 1 and 4 and the assembly and mounting thereof is exactly as shown specifically in FIG. 4.

While FIG. 3 shows a single compartment C corresponding to and receiving the vibratory pad and its supporting plate, the same type of compartmenting is contemplated for couch 58 of FIG. 6 and wherein the framework thereof provides a series of compartments for the individual vibratory elements 61—53' such as shown in detail in my co-pending patent application Serial No. 646,140 filed March 14, 1957 about to issue into U.S. Patent 2,822,804.

Mounting of the individual vibratory elements within the couch is the same as in said co-pending application and as shown herein except that there is provided a resilient cover 60 for the complete couch which corresponds to the cover 49—50 of FIG. 4, i.e., includes a resilient preferably sponge rubber support similarly apertured corresponding to the apertures shown in FIG. 6, and with the respective openings 59 bounded by covering material 60. In other words, the individual vibratory pads are separately upholstered in the same manner as illustrated in FIG. 4.

In the above noted drawing, FIG. 7 represents a plan view of an ottoman similar to FIG. 1, but incorporating a pair of compartments D and E within the frame thereof. Corresponding to each compartment are separately upholstered motor operated vibratory pads 65—66 loosely positioned within corresponding apertures 64 formed within the resilient support 36. The construction of the vibratory elements 65—66 and the arrangement thereof is exactly the same as shown in FIG. 4.

In FIG. 6 there are shown on dotted lines a series of individual compartments F, G, H, I, C' and J corresponding to compartment C of FIG. 3, each respectively housing a vibratory mechanism such as shown in FIG. 3.

While springs 27 are employed as the resilient support means for plate 23 as shown in FIG. 4, equivalent means may be employed such as rubber mounting blocks and accomplish the same result.

While a rheostat 42—43 is shown in FIG. 3 as one means of controlling the speed of operation of motor 37, any other suitable means may be employed for this purpose, as for example a powerstat or transformer as shown in my copending application Serial 646,140, filed March 14, 1957, about to become United States Patent 2,822,804, on February 11, 1958.

While the present application describes the present invention as applied to a vibration couch, leg rest or ottoman, it is contemplated that the present vibratory device as set forth in the claims may also be applied to chairs, beds, mattresses, or related structures adapted to support the human body.

Having described my invention, reference should now be had to the following claims:

1. A massage couch comprising a hollow horizontally disposed frame on legs including a series of variably spaced compartments, a horizontal support platform bridging said frame and secured thereto, there being a series of enlarged apertures of predetermined shape formed through said platform, one aperture for each compartment arranged centrally thereof, a similarly shaped vibration pad loosely nested within each aperture within the plane of said platform, a mounting plate parallel to and spaced below each pad, a series of spacers between each pad and plate and interconnected therewith, a plurality of resilient means interconnecting spaced marginal portions of said plates with corresponding portions of said frame within individual compartments for yieldingly supporting said plates loosely therein, a vibration producing motor with an unbalanced shaft joined to each plate and suspended therefrom, a relatively thick, flexible and resilient cover means snugly extending over the surface of said platform and secured to said frame, said cover means having a series of enlarged apertures therethrough corresponding to each vibration pad and separate relatively thick flexible and resilient cover means snugly extending over the surface of each vibration pad and secured thereto and loosely positioned within one of said apertures.

2. A massage couch comprising a hollow horizontally disposed frame on legs, a horizontal support platform bridging said frame and secured thereto, there being a series of enlarged apertures of predetermined shape formed through said platform, a similarly shaped vibration pad loosely nested within each aperture within the plane of said platform, a mounting plate parallel to and spaced below each pad, a series of spacers between each pad and plate and interconnected therewith, a plurality of resilient means interconnecting spaced marginal portions of said plates with corresponding portions of said frame for yieldingly supporting said plates loosely therein, a vibration producing motor with an unbalanced shaft joined to each plate and suspended therefrom, a relatively thick, flexible and resilient cover means snugly extending over the surface of said platform and secured to said frame, said cover means having a series of enlarged apertures therethrough corresponding to each vibration pad, and separate relatively thick flexible and resilient cover means snugly extending over the surface of each vibration pad and secured thereto and loosely positioned within one of said apertures.

3. A vibratory device comprising a hollow, horizontally disposed frame on legs having a single compartment, a horizontal support platform bridging said frame and secured thereto over said compartment, there being an enlarged aperture formed through said platform, a similarly shaped vibration pad loosely nested within said aperture within the plane of said platform, a mounting plate parallel to and spaced below said pad, a series of spacers between said pad and plate interconnected therewith, a plurality of resilient means interconnecting spaced marginal portions of said plate with corresponding portions of said frame within said compartment for yieldingly supporting said plate loosely therein, a vibration producing motor with an unbalanced shaft arranged below said plate and suspended therefrom, and relatively thick, flexible, resilient cover means snugly extending over the surface of said platform and over the surface of said pad, said resilient cover means having a transverse aperture adapted to loosely receive said vibration pad, said resilient cover means including a separate cover for said vibration pad positioned within said aperture.

4. A vibratory device comprising a hollow, horizontally disposed frame on legs having a single compartment, a horizontal support platform bridging said frame and secured thereto over said compartment, there being an enlarged aperture formed through said platform, a similarly shaped vibration pad loosely nested within said aperture within the plane of said platform, a mounting plate parallel to and spaced below said pad, a series of spacers between said pad and plate interconnected therewith, a plurality of resilient means interconnecting spaced marginal portions of said plate with corresponding portions of said frame within said compartment for yieldingly supporting said plate loosely therein, a vibration producing motor with an unbalanced shaft arranged below said plate and suspended therefrom, relatively thick, flexible, and resilient cover means snugly extending over the surface of said platform and over the surface of said pad; and an insulating layer co-extensive with and secured to the undersurface of said mounting plate.

5. A vibratory device comprising a hollow, horizontally disposed frame on legs having a single compartment, a horizontal support platform bridging said frame and secured thereto over said compartment, there being an enlarged aperture formed through said platform, a similarly shaped vibration pad loosely nested within said aperture within the plane of said platform, a mounting plate parallel to and spaced below said pad, a series of spacers between said pad and plate interconnected therewith, a plurality of resilient means interconnecting spaced marginal portions of said plate with corresponding portions of said frame within said compartment for yieldingly supporting said plate loosely therein, a vibration producing motor with an unbalanced shaft arranged below said plate and suspended therefrom, relatively thick, flexible, and resilient cover means snugly extending over the surface of said platform and over the surface of said pad; and a sealing pad secured to the undersurface of said support platform, apertured to receive said vibration pad, and secured to peripheral undersurface portions thereof.

References Cited in the file of this patent

UNITED STATES PATENTS

| Re. 24,487 | Leach | June 17, 1958 |
| 2,715,901 | Blake | Aug. 23, 1955 |

FOREIGN PATENTS

| 970,160 | France | June 7, 1950 |